United States Patent
Sakamaki

(10) Patent No.: US 6,549,602 B2
(45) Date of Patent: Apr. 15, 2003

(54) INCORE PIPING SECTION MAINTENANCE SYSTEM OF REACTOR

(75) Inventor: Kazuo Sakamaki, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/860,515

(22) Filed: May 21, 2001

(65) Prior Publication Data

US 2001/0033631 A1 Oct. 25, 2001

Related U.S. Application Data

(62) Division of application No. 09/361,620, filed on Jul. 27, 1999, now Pat. No. 6,259,759.

(30) Foreign Application Priority Data

Jul. 27, 1998 (JP) ............................................. 10-211580

(51) Int. Cl.⁷ ............................. G21C 9/00; B23K 26/00
(52) U.S. Cl. .................... 376/305; 376/326; 219/121.6; 734/1; 148/525
(58) Field of Search ................................ 376/305, 260, 376/249; 219/121.6; 134/1; 148/525

(56) References Cited

U.S. PATENT DOCUMENTS

| | | | | |
|---|---|---|---|---|
| 4,978,834 A | * | 12/1990 | Griffaton | 219/121.63 |
| 5,089,684 A | * | 2/1992 | Griffaton | 219/121.63 |
| 5,496,422 A | | 3/1996 | Morishige et al. | 148/525 |
| 5,514,849 A | * | 5/1996 | Findlan | 219/121.63 |
| 5,573,683 A | | 11/1996 | Findlan et al. | 219/121.64 |
| 5,611,948 A | * | 3/1997 | Hawkins | 219/121.63 |
| 5,667,706 A | * | 9/1997 | Piri et al. | 219/121.64 |
| 5,789,720 A | * | 8/1998 | LaGally et al. | 219/121.64 |
| 5,790,620 A | * | 8/1998 | Okazaki et al. | 376/305 |
| 5,958,267 A | | 9/1999 | Lingenfelter et al. | 219/121.63 |
| 5,977,513 A | | 11/1999 | Findlan | 219/121.64 |
| 6,060,686 A | | 5/2000 | Jones | 219/121.84 |

FOREIGN PATENT DOCUMENTS

| | | |
|---|---|---|
| JP | 04-069596 | 3/1992 |
| JP | 08-029579 | 2/1996 |
| JP | 09-257984 | 10/1997 |
| JP | 10-026692 | 1/1998 |
| JP | 11-142578 | 5/1999 |
| WO | WO 96/13838 | 5/1996 |

* cited by examiner

Primary Examiner—Michael J. Carone
Assistant Examiner—R Palabrica
(74) Attorney, Agent, or Firm—Finnegan, Henderson, Farabow, Garrett & Dunner, L.L.P.

(57) ABSTRACT

An incore piping section maintenance system of a reactor comprises a maintenance system main body which is fixed to a maintenance target portion in a reactor pressure vessel or in the vicinity thereof to which a preventive-maintenance operation is executed, a support mechanism provided for the maintenance system main body so as to be movable in a reciprocal manner towards the maintenance target portion, a laser generator for generating a laser beam, a laser de-sensitization treatment apparatus which is rotatably supported around an axis of the support mechanism and which includes a laser irradiation section for irradiating the laser beam to the maintenance target portion, and an optical transmission element which guides the laser beam outputted from the laser generator to the laser de-sensitization treatment mechanism.

2 Claims, 9 Drawing Sheets

THREE FACTORS FOR SCC (STRESS CORROSION CRACKING)
AND LASER DE-SENSITIZATION TREATMENT

INCORE PIPING SECTION MAINTENANCE SYSTEM OF REACTOR

This is a division of application Ser No. 09/361,620, filed Jul. 27,1999, now U.S. Pat. No. 6,259,759, issued Jul. 10, 2001, which is incorporated herein by

BACKGROUND OF THE INVENTION

The present invention relates to a maintenance technology of an incore piping section of a reactor such as a boiling water reactor or the like, and in particular, to an incore piping section maintenance system of a reactor, which performs preventive repair and preventive maintenance of weld (welded or to be welded) zones or portions in an incore piping section located in a reactor pressure vessel.

A boiling water reactor such as a light water reactor is constructed as shown in a longitudinal cross-sectional view of FIG. 7. A reactor core 2 is installed in a reactor pressure vessel 1, and the reactor core 2 is immersed in a coolant 3. Further, the reactor core 2 is constructed in a manner that a plurality of fuel assemblies (not shown) and control rods are arranged in a cylindrical core shroud 4.

A reactor water (coolant) 3 in the reactor pressure vessel 1 flows upward through the core 2 from a core lower plenum 9. The coolant 3 receives a nuclear reaction energy when flowing upward through the core 2, and then, its temperature and pressure rise up, and thus, becomes a two-phase flow state of water and steam (vapor). The coolant 3, which is in a gas-liquid two-phase flow state, flows into a steam separator 5 located above the reactor core 2, and then, is separated into water and steam by means of the steam separator 5. A steam thus gas-liquid separated is introduced into a steam desiccator or drier 6 located above the steam separator 5, and then, is dried here so as to become a dry steam. The dry steam is supplied as a main steam to a steam turbine (not shown) via a main steam pipe (tube) 7 connected to the reactor pressure vessel 1, and then, is used for power generation.

On the other hand, a water thus gas-liquid separated is guided to a truss or sleeve-like downcomer portion 8 between the reactor core 2 and the reactor pressure vessel 1, and then, flows downward through the downcomer portion 8, and thus, is guided to a core lower plenum 9. Further, in the downcomer portion 8, an outer periphery of the core shroud 4 is provided with a plurality of jet pumps 10 at equal intervals.

Meanwhile, the core lower plenum 9 below the reactor core 2 is provided with a control rod guide pipe 11, and a control rod driving mechanism 12 is located below the control rod guide pipe 11. The control rod driving mechanism 12 carries out a control for inserting and pulling a control rod into and out of the reactor core 2 through the control rod guide pipe 11, and thus, performs a power control of reactor.

Moreover, two reactor re-circulation systems including a reactor re-circulation pump (not shown) are located outside the reactor pressure vessel 1. When the re-circulation pump of the reactor re-circulation system is operated, a coolant in the reactor pressure vessel 1 passes through a reactor re-circulation system (not shown) from a cooler re-circulation water outlet nozzle 14, and then, is returned into the reactor pressure vessel 1, and thus, is guided to the jet pump 10 via the re-circulation water inlet nozzle 13. The jet pump 10 sucks its surrounding coolant, and then, supplies it into the core lower plenum 9. More specifically, by a driving water supplied from the reactor re-circulation pump to the jet pump 10, the jet pump 10 forcibly circulates the coolant 3 in the reactor core 2 via the core lower plenum 9.

On the other hand, the reactor pressure vessel 1 is provided with a core spray system 15 which constitutes an emergency cooling system of a reactor. The core spray system 15 has a piping arrangement as shown in FIG. 5 and FIG. 6. FIG. 6 is a perspective view showing a state that the core spray system 15 is located in the reactor pressure vessel.

As shown in FIG. 5, the core spray system 15 extends into the core shroud 4 from the outside of the reactor pressure vessel 1 penetrating through the reactor pressure vessel (RPV) 1 and the core shroud and includes a core spray system pipe for introducing a spray water into the core shroud 4. The core spray system pipe is a piping part for connecting the RPV 1 and the core shroud 4 in the RPV 1.

Moreover, a pipeline of the core spray system 15 is arranged as shown in FIG. 6. In the core spray system 15, an incore branch part 16 is connected to one end of the core spray system pipeline after penetrating through the RPV 1. A semi-circular pipe 17 is formed in a manner of extending from the incore branch part 16 like a semi-circular arc and branching right and left. Each end portion of the semi-circular pipe 17 branching right and left is formed at a position separating by an angle of about 180° along an inner wall of the RPV 1. The semi-circular pipe 17 is connected with a vertical pipe 18 which extends downward from each end portion thereof. A lower end of the vertical pipe 18 constitutes the other end of the core spray system pipeline. A lower end of each vertical pipe 18 is connected via a sleeve 20 to a riser pipe 19 which rises up from the core shroud 4, and thus, a core spray system pipeline is constructed. The core spray system pipeline functions as a reactor emergency cooling system into which a cooling water for cooling the core is supplied in a reactor emergency shutdown. When the emergency cooling system is operated, a fluid vibration, thermal deformation and the like are generated in the core spray system pipeline.

For this reason, the core spray system pipeline is used under severe circumstances as compared with other equipments, and as a result, a great load is applied to each member of the core spray pipeline, and as the case may be, a great stress is applied to the core spray pipe.

Some early nuclear power plants have been operated for more than twenty years, and hence, stable operation for aged plants makes it more vitally important to implement the preventive maintenance of a reactor pressure vessel and internal elements of the early plants which were made of high carbon stainless steel susceptible to Stress Corrosion Cracking (SCC). As mentioned hereinlater, the SCC is caused by the combination of three factors of Material, Stress and Environment, and it is important to get rid of one of three factors for the preventive maintenance.

In the event that an excessive load is applied to the core spray pipe of the core spray system 15 due to any factors, or an inner surface of the core spray pipe rusts away, there is the possibility that a crack or the like is generated in the pipe due to the rust.

Furthermore, because an austenitic stainless steel pipe is mainly used as a material for the core spray pipe, if the following three factors, that is, Stress, Corrosion Environment and Material (generation of chromium deficiency layer) are realized, the Stress Corrosion Cracking (SCC) is generated, and for this reason, it is anticipated that the core spray pipe is damaged.

This stress corrosion cracking phenomenon does not happen if any one of the three factors, mentioned above, lacks. In order to prevent this stress corrosion cracking, there is a need of making various measures so that the aforesaid three factors are not established. Moreover, in the case where a rush and crack is generated in a surface of the core spray pipe due to any factors, when these rush and crack have left, the crack is progressing, and as a result, there may be the case where a crack is generated in the core spray pipe. Thus, when the core spray system 15, which functions as an emergency cooling system of a reactor, becomes a state as described above, it is anticipated that a harmful influence is given to other equipments included in the core, thus being not preferable.

Furthermore, recently, a laser de-sensitization treatment (LDT) technology has mainly been developed for the preventive maintenance of the thin pipe and plate. A high power laser beam produces a molten layer and solution heat treated layer and can change the sensitized surface of a stainless steel to be de-sensitized.

The LDT is a treatment for suppressing a sensitivity (de-sensitization) of an Intergranular Stress Corrosion Cracking (IGSCC) by the steps of irradiating with laser beams a surface of a stainless steel sensitized by an influence of welding heat or the like and forming a solution heat treatment layer and a molten coagulation layer.

That is, FIG. 8 shows relationship among the above mentioned three factors such as Material, Stress and Environment for improving the SCC proof property in view of the de-sensitization treatment, and as shown in FIG. 9, when a YAG laser beam of high energy density passing through an optical fiber, for example, is irradiated on a laser execution portion through optical means such as mirror or lens, the portion subjected to the laser execution is rapidly heated, a Cr carbide is decomposed and, hence, a Cr-lacking layer near a grain boundary is lost. After the laser beam has passed, the laser execution portion is rapidly cooled and the surface thereof is de-sensitized. By continuously performing such de-sensitization treatment to the surface contacting the solution, the solution heat treatment layer and the molten coagulation layer are formed.

SUMMARY OF THE INVENTION

The present invention has been made in view of the above-mentioned circumstances. It is, therefore, an object of the present invention to provide an incore piping section maintenance system of a reactor, which can securely and effectively perform a preventive maintenance treatment such as a surface de-sensitization of the reactor incore piping section by a laser beam irradiation, that is, a laser de-sensitization treatment, and thus, can improve normalization, soundness and reliability of the reactor core piping section.

Another object of the present invention is to provide an incore piping section maintenance system of a reactor, which can carry out a laser irradiation through remote control with respect to a maintenance target portion of the reactor core piping section so as to perform a surface de-sensitization of weld zone, that is, a laser de-sensitization treatment for a short time, and can effectively and smoothly perform a preventive maintenance such as a preventive repair or the like.

Still another object of the present invention is to provide an incore piping section maintenance system of a reactor, which can effectively perform an inspection, repair or polishing work of the reactor incore piping section through remote control without draining off a reactor water in a reactor pressure vessel.

These and other objects can be achieved, according to the present invention, by providing, in one aspect, an incore piping section maintenance system of a reactor, comprising:

a maintenance system main body which is fixed to a maintenance target portion in a reactor pressure vessel or in the vicinity thereof to which a preventive-maintenance operation is executed;

support means provided for the maintenance system main body so as to be movable in a reciprocal manner towards the maintenance target portion;

laser generation means for generating a laser beam;

laser de-sensitization treatment means which is rotatably supported around an axis of the support means and which includes a laser irradiation section for irradiating the laser beam to the maintenance target portion; and optical transmission means which guides the laser beam outputted from the laser generation means to the laser de-sensitization treatment means.

In this aspect, the maintenance target portion is an incore piping section located in the reactor pressure vessel, the support means includes seal means including expandable seal members so as to seal both sides of the laser irradiation section, and the seal means forms an atmospheric environment to the laser irradiation section so that the laser irradiation section between the seal members is filled with a purge gas, a laser irradiation being then carried out in the purge gas.

The laser de-sensitization treatment means further includes an inspection monitoring means provided for the laser irradiation section or in the vicinity thereof. The laser de-sensitization treatment means further includes a maintenance target portion detector which detects and confirms a laser execution position to which the preventive-maintenance operation is executed. The maintenance target portion detector is an ultrasonic flaw detector which detects and confirms the laser execution position. The maintenance target portion detector may be a ferrite indicator, the ferrite indicator distinguishing a difference in ferrite quantity between a weld zone and a base material of the incore piping section so as to detect and confirm a laser execution position.

The laser de-sensitization treatment means further includes a polishing means so that the laser execution portion is subjected to polishing working by means of the polishing means.

In another aspect, there is provided an incore piping section maintenance system of a reactor, comprising:

a maintenance system main body to be inserted into a pipe of an incore piping section located in a reactor pressure vessel;

main body supporting means for detachably fixing the maintenance system main body in the pipe;

a turning arm supported to the maintenance system main body;

turning means turning and driving the turning arm;

axial moving means which is supported so as to be slidable in a direction substantially perpendicular to the turning arm, the axial moving means being movable in an axial direction with respect to a header;

laser generation means for generating laser beam;

laser de-sensitization treatment means which is supported on the axial moving means and includes a laser irradiation section for irradiating the laser beam to an outer surface of the pipe; and optical transmission means which guides a laser beam outputted from the laser generation means to the laser de-sensitization treatment means.

In this aspect, the main body supporting means includes at least three main body supporting mechanisms and each of the main body supporting mechanisms is constructed in combination with a link mechanism including a guide member and a cylinder apparatus for driving the guide member of the link mechanism so that the guide member comes in and out from the maintenance system main body.

According to the present invention of the characters mentioned above, in the incore piping section maintenance system of a reactor, the laser de-sensitization treatment means is located in the pipe of the incore piping section or on a predetermined position on the pipe outer peripheral surface, and a laser beam is irradiated from the laser de-sensitization treatment means to the entire periphery of the incore piping section thereby to perform a surface de-sensitization of the incore piping section and a laser de-sensitization treatment and to effectively perform preventive repair and preventive maintenance by a laser beam. Therefore, it is possible to greatly enhance normalization, soundness and reliability of the incore piping section such as a core spray pipe or the like.

Further, in the incore piping section maintenance system of a reactor according to the present invention, it is possible to carry out a surface de-sensitization, that is, laser de-sensitization treatment through the laser de-sensitization treatment means in the water by remote control. Therefore, a maintenance work can be readily performed, and also, it is possible to greatly reduce a possibility that a worker is exposed to a radiation.

Furthermore, in the incore piping section maintenance system of the present invention, it is possible to stably set the maintenance system main body onto the maintenance target portion of the incore piping section or in the vicinity thereof by the remote control. Therefore, a work for the preventive maintenance and the preventive repair of the incore piping section can be stably and effectively carried out.

The nature and further characteristic features of the present invention will be made more clear from the following descriptions made with reference to the accompanying drawings.

DESCRIPTION OF THE PREFERRED EMBODIMENTS

Embodiments of an incore piping section maintenance system according to the present invention will be described hereunder.

Figure 1:
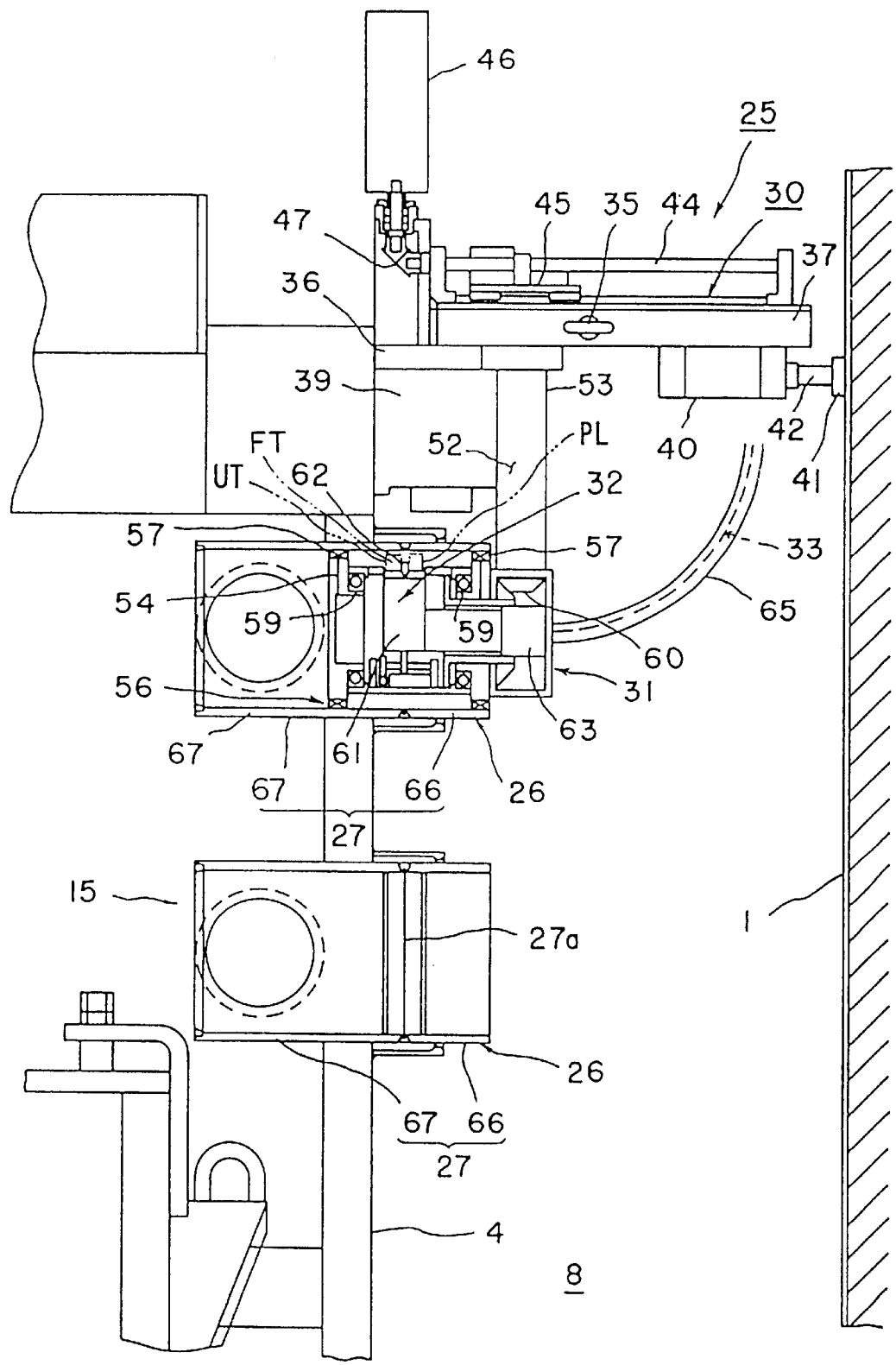
FIG. 1 is a longitudinal sectional view showing a first embodiment of an incore piping section maintenance system of a reactor according to the present invention.
Figure 2:
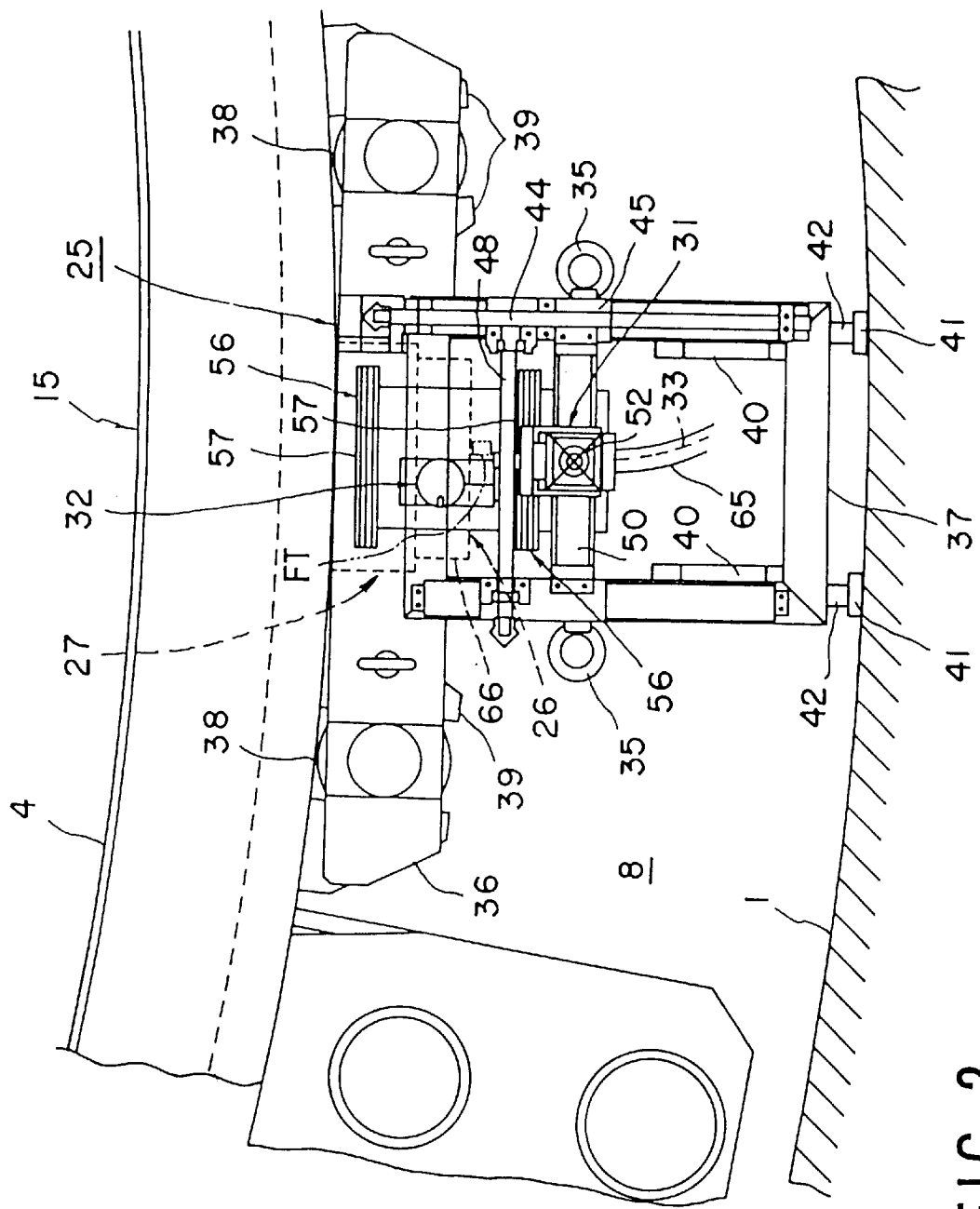
FIG. 2 is a plan view schematically showing the first embodiment of an incore piping section maintenance system of a reactor according to the present invention.

FIG. 1 is a longitudinal sectional view showing a first embodiment of an incore piping section maintenance system according to the present invention, and FIG. 2 is a plain view showing the same. The incore piping section maintenance system is applied to an incore piping section of a light water reactor such as a boiling water reactor or the like, and performs a surface de-sensitization of metallographic structure of the incore piping section, a preventive maintenance of weld zones (welded or to be welded portion) or the like, and a preventive maintenance work.

Figure 5:
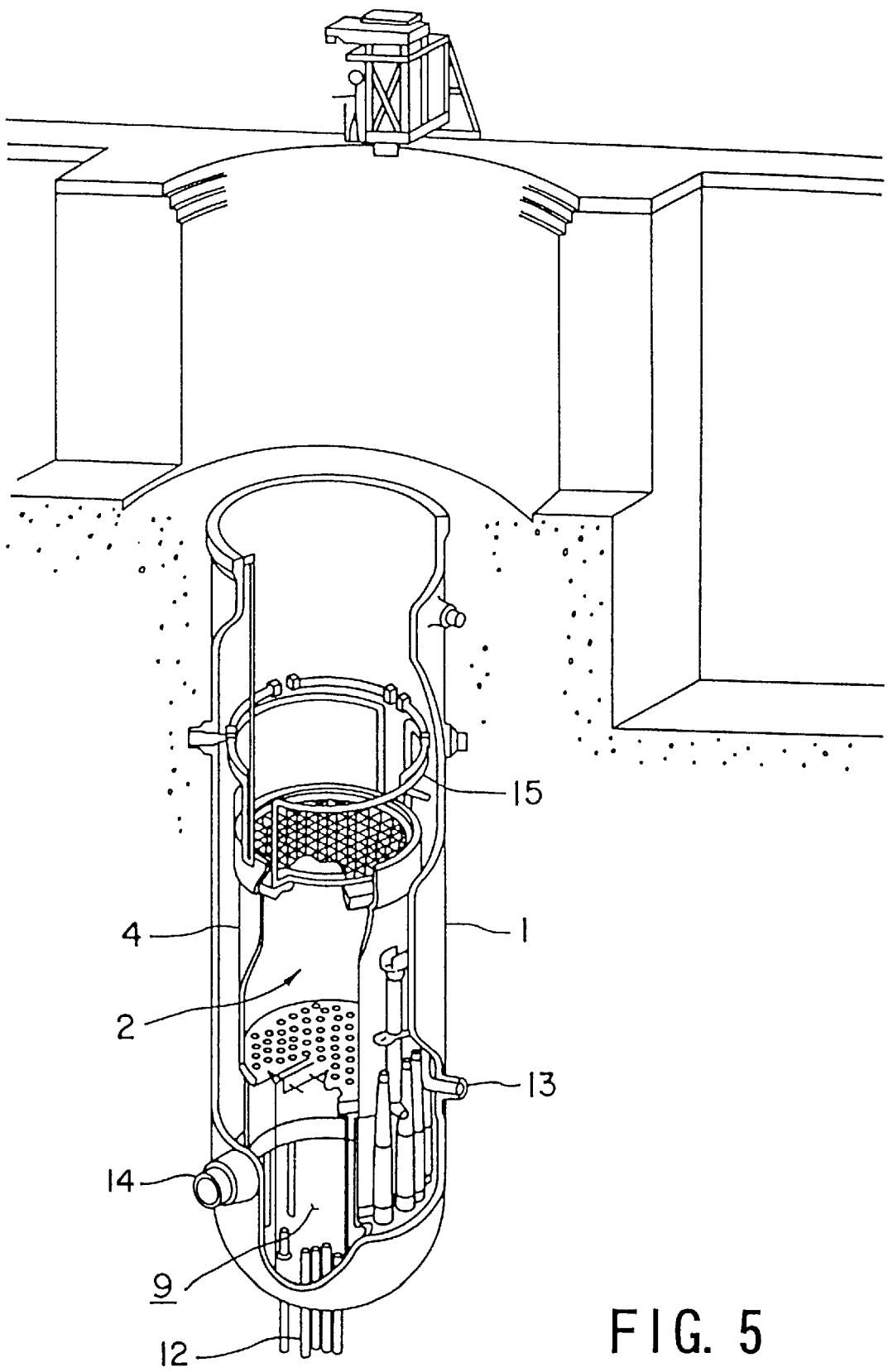
FIG. 5 is a perspective view partly in section showing a boiling water reactor.
Figure 6:
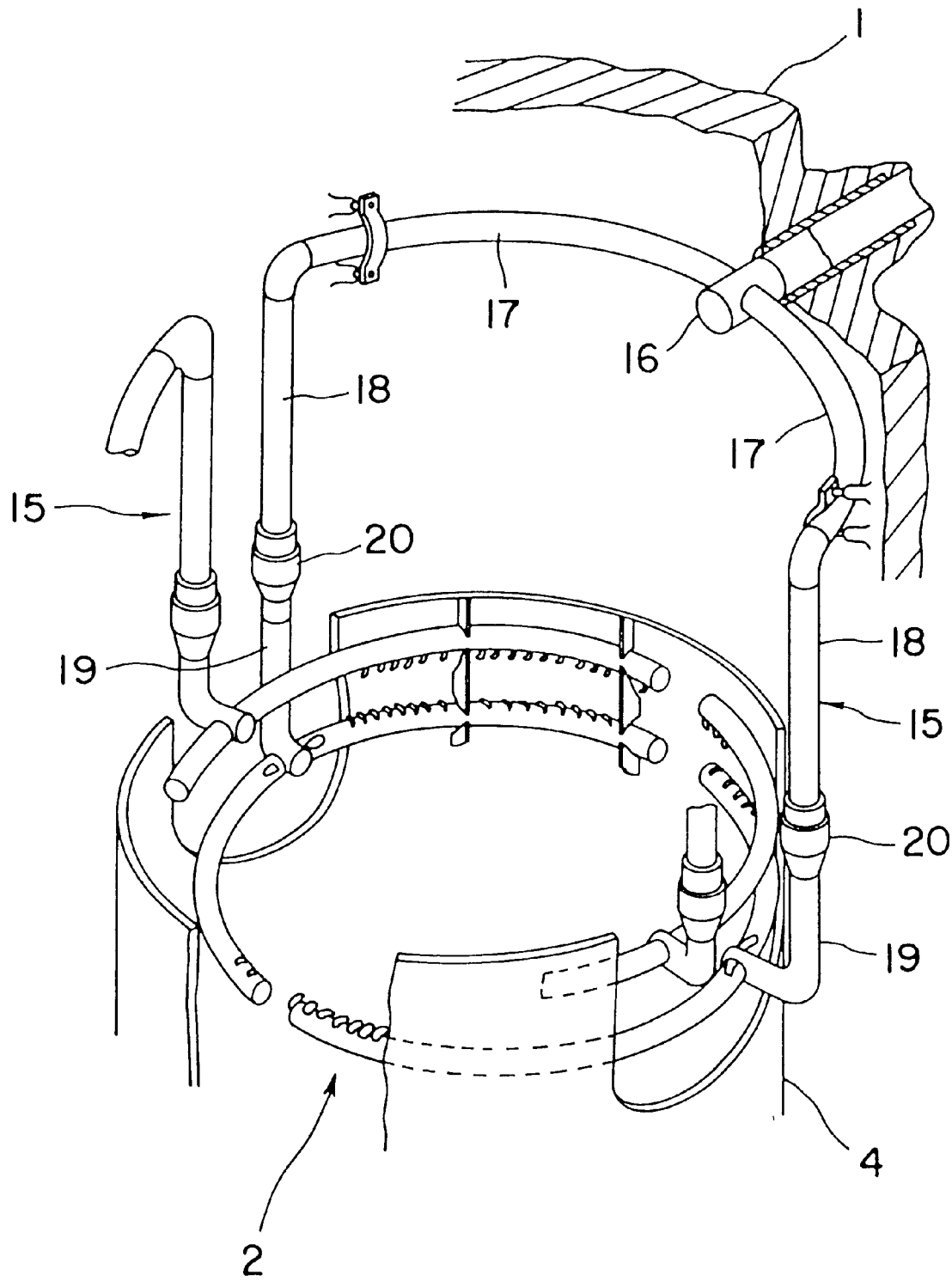
FIG. 6 is a perspective view showing a core spray piping provided as an emergency core cooling system of a conventional boiling water type reactor.
Figure 7:
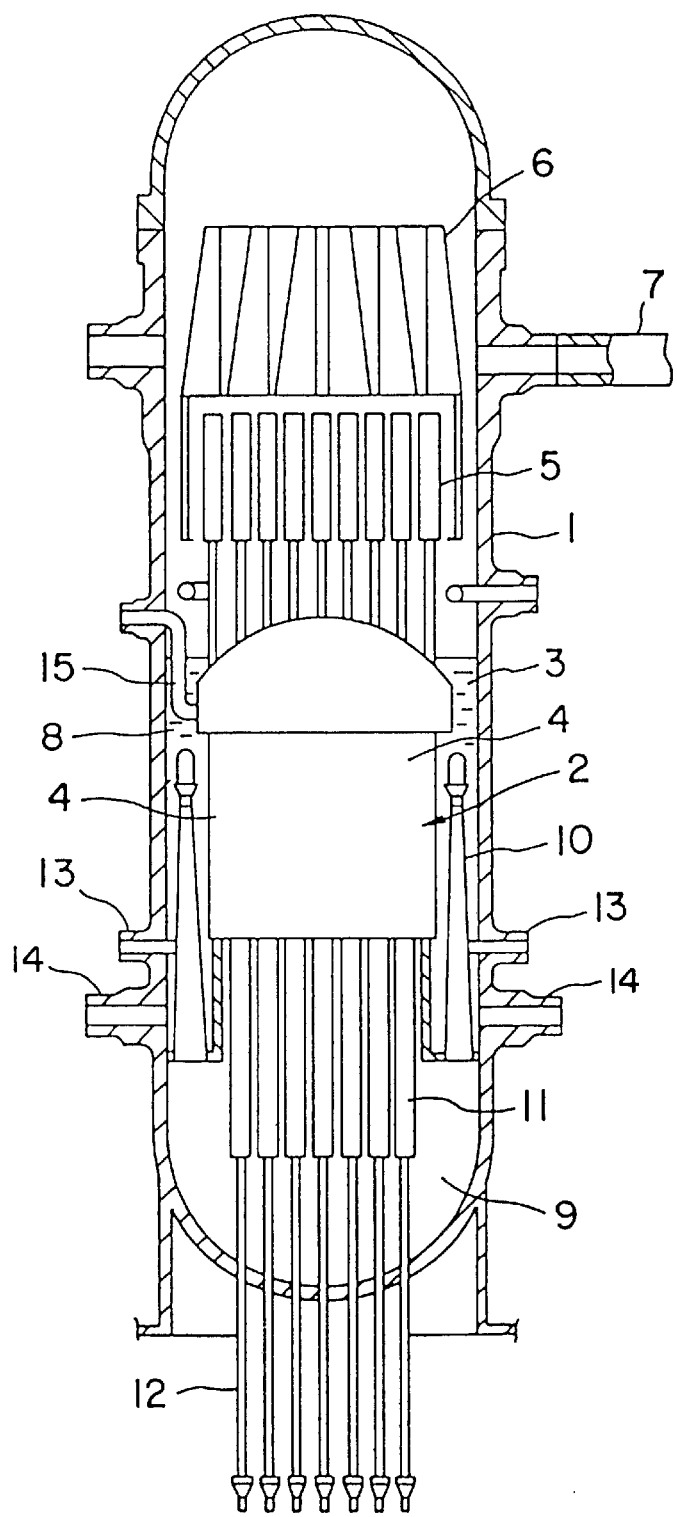
FIG. 7 is a longitudinal cross-sectional view showing a boiling water type reactor.
Figure 8:
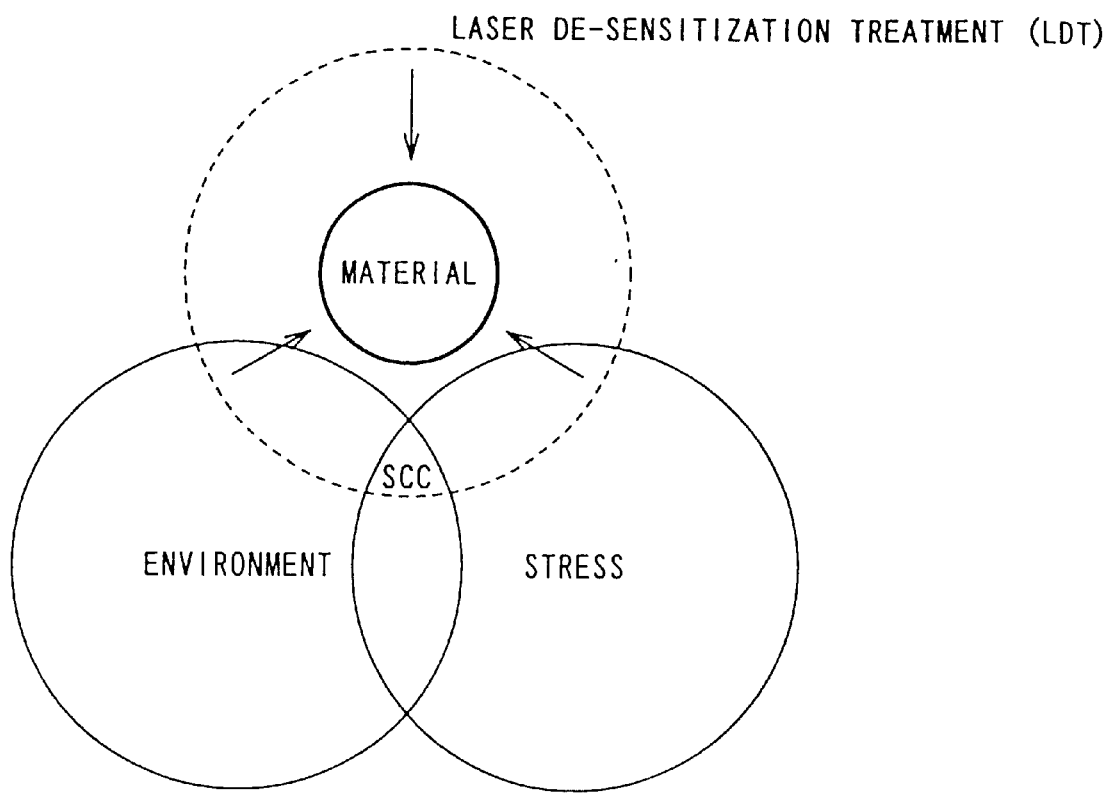
FIG. 8 is an illustration showing a relationship between three factors for SCC (stress corrosion cracking) and laser de-sensitization treatment.
Figure 9:
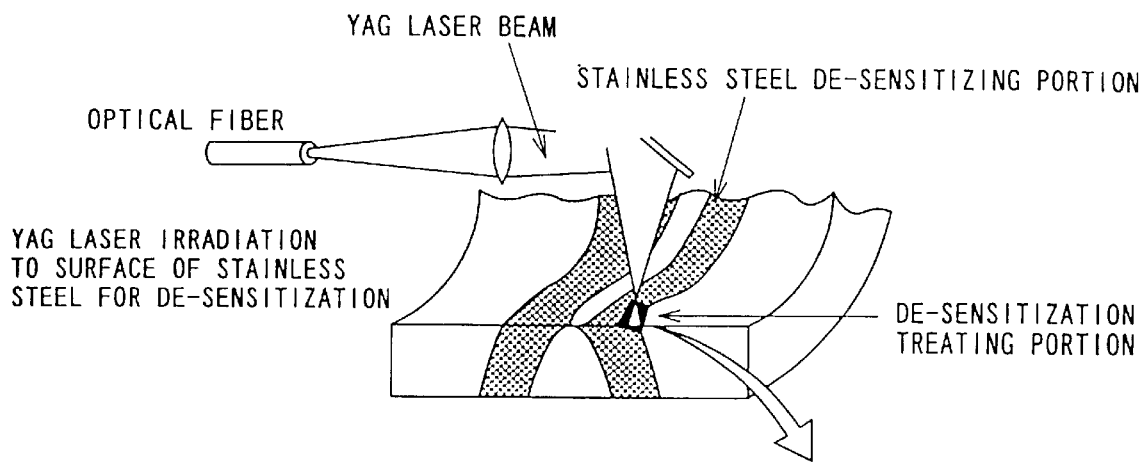
FIG. 9 is an illustration showing IDSCC preventive-maintenance technology.

FIG. 1 and FIG. 2 each shows an example in which an incore piping section maintenance system according to the present invention is applied to an incore piping section 26 in a reactor pressure vessel 1 of a boiling water reactor. The reactor pressure vessel 1 has, as a whole, the same structure as the conventional reactor pressure vessel shown in FIG. 5 to FIG. 7, and therefore, like reference numerals are used to designate the identical components used in these figures, and the detailed explanation thereof is omitted herein. The incore piping section maintenance system 25 shown in FIG. 1 and FIG. 2 is installed and fixed to a maintenance target portion of the reactor pressure vessel 1 or in the vicinity thereof. The maintenance target portion includes an incore piping section 26, for example, an inner weld zone 27a of a core spray pipe 27 of a core spray system 15, or the like, and is a place suitable for preventive repair and preventive maintenance of the incore piping section 26 of the reactor pressure vessel 1.

Figure 3:
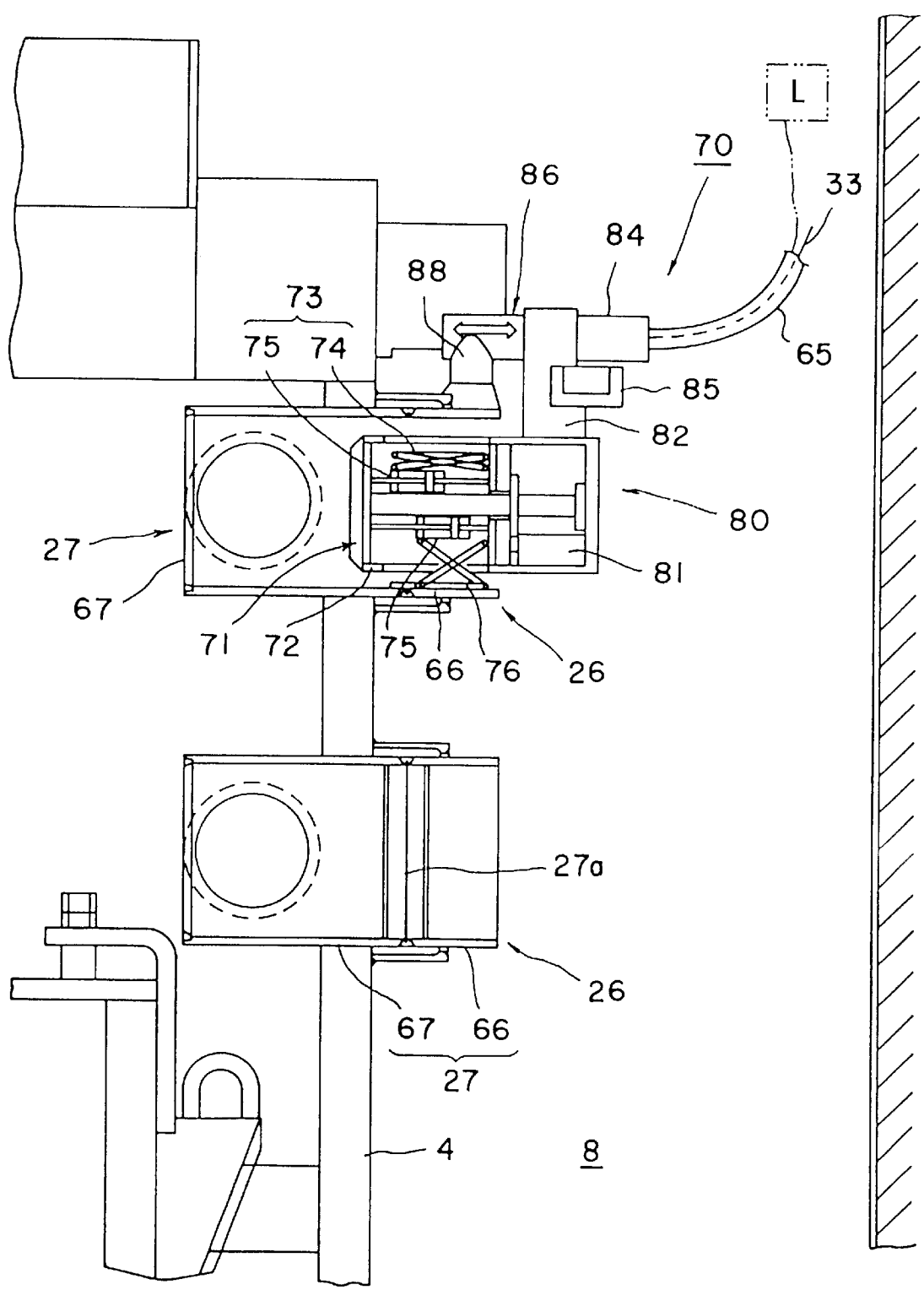
FIG. 3 is a longitudinal sectional view showing a second embodiment of an incore piping section maintenance system of a reactor according to the present invention.

The incore piping section maintenance system 25 includes: a maintenance system main body 30 which is located at a maintenance target portion or in the vicinity of the target portion between the core shroud 4 and the inner wall of the reactor pressure vessel 1; a support means 31 which is located on the maintenance system main body 30 so as to reciprocate towards or apart from the maintenance target portion; a laser de-sensitization treatment means 32 which is rotatably supported around an axis of the support means 31 and carries out a laser beam irradiation with respect to the maintenance target portion; and an optical transmission means 33 which guides a laser beam oscillated from a laser generation device or equipment L, such as shown in FIG. 3, to the laser de-sensitization treatment means 32. Further, the incore piping section maintenance system 25 is supported on an overhead traveling crane (not shown) which is located above the reactor pressure vessel 1 and including a fuel exchanger or the like and is freely movable up and down by means of cable. A reference numeral 35 denotes a hang sling or hang hook of the incore piping section maintenance system 25.

The maintenance system main body 30 is a main frame assembly which is constructed in a manner of integrally assembling a support plate 36 and a rectangular base frame 37 which functions as a traveling cradle. The support roller 38 supported on the support plate 36 is removably mounted from the outside to a shroud head bolt bracket 39 which projects from an outer peripheral wall of the core shroud 4 and functions as a support bracket.

On the other hand, a pair of fixed cylinders 40 are located on a lower portion of the base frame 37 facing an inner peripheral wall of the reactor pressure vessel 1. The fixed cylinders 40 are arranged in parallel to each other and are provided with an actuating rod 42 which has a mounting head or mounting pad 41 so as to freely reciprocate. The actuating rod 42 constitutes a piston rod, and reciprocates between a non-actuation position retracting by an actuation of the fixed cylinder 40 and an actuation position projecting by the same. When the fixed cylinder 40 is situated on the actuation position, the mounting head 41 presses the inner peripheral wall of the reactor pressure vessel 1 so as to be frictionally held thereto.

The maintenance system main body 30 constituting the main frame assembly are pressed against the shroud head bolt bracket 39 at its one side and is pressed against the inner peripheral wall of the reactor pressure vessel 1 at the other side, and thus, is stably fixed and supported.

In the maintenance system main body 30, a screw shaft 44 is rotatably supported on the base frame 37. The screw shafts 44 are located in a state of mutually facing at opposite sides of the base frame 37 and are provided with a linear guide 45 which is freely reciprocated. The linear guide 45 is supported so as to be radially movable. Further, the screw shaft 44 is connected with a reversible driving motor 46 which is installed on the support plate 36 through a gear mechanism 47. When the driving motor 46 is driven, the linear guide 45 is reciprocated along the screw shaft 44.

On the other hand, the screw shafts 44 located on the opposite sides of the base frame 37 may be driven so as to be synchronous with each other, or one of the screw shafts 44 may be replaced with a guide shaft for a slide guide. Moreover, the linear guide 45 is provided with a bridge-like guide shaft 48 which extends in a direction perpendicular to the screw shaft 44, and the fixed support means 31 is movably supported on the guide shaft 48. The support means 31 is moved while being supported to a frame or plate-like bridge guide member 50 of the linear guide 45 and is supported in a state of projecting downward from the linear guide 45. The guide shaft 48 for moving the support means 31 may be a screw shaft driven by a motor or an actuating rod driven by a cylinder.

The support means 31 supported on the linear guide 45 is supported so as to be adjustable and movable in an XY direction on one plane formed by the maintenance system main body 30. Further, the support means 31 includes a cylindrical motor case 53 having a built-in revolving motor 52 as a support cylinder and has a support body (assembly) 54 which extends sideward from a lower end of the motor case 53 so as to be attached integrally therewith and is supported in form of a cantilever beam.

The support body 54 of the support means 31 is provided with seal means 56 at its both sides. The seal means 56 is a ring or truss-like seal member 57 which is mounted at both sides of the support body 54 in a state of being arranged in parallel in a multi-stage, for example, two stages. Each seal member 57 has a hollow structure and is freely expandable and shrinkable by freely injecting or removing a compressive fluid, for example, a compressed air, into and from its interior.

Moreover, the support body 54 of the fixed support means 31 is provided with a laser de-sensitization treatment means 32. The laser de-sensitization treatment means 32 is rotatably supported on the central portion of the support body 54 by means of bearing 59 while being connected to a revolving motor 52 through a gear mechanism 60. When the revolving motor 52 is driven, the laser de-sensitization treatment means 32 is rotatable around a shaft of the bearing 59.

The laser de-sensitization treatment means 32 has a laser scanning optical system 61 and a laser irradiating section 62. The laser irradiating section 62 irradiates with a laser beam the incore piping section 26 which is the maintenance target portion so as to perform a surface de-sensitization of a metallographic structure of the incore piping section 26, a preventive repair of weld zones or the like and a preventive maintenance.

In the laser de-sensitization treatment means 32, the laser scanning optical system 61 guides a laser beam incident upon a laser supply port 63 to the laser irradiating section, and therefore, a laser transmission path is formed by the laser scanning optical system 61 in the laser de-sensitization treatment means 32. The laser scanning optical system 61 is constructed in the combination with a condenser (converging) lens, a mirror or the like.

A laser beam oscillated from the laser generation device or equipment is guided to the laser supply port 63 of the laser de-sensitization treatment means 32 via a flexible optical transmission means 33 such as an optical fiber cable or the like. The optical transmission means 33 is included in a transmission tube 65. The laser generation equipment may be located on an operation floor (not shown) above the reactor pressure vessel 1, or may be located on a fuel exchanger or the maintenance system main body 30. In the case of locating the laser generation equipment on the maintenance system main body 30, a waterproof treatment is required.

On the other hand, in addition to the optical transmission means 33 for transmitting a laser beam, the transmission tube 65 includes power, as a driving source, and control signal cables, various flexible pipes for feeding and discharging an atmosphere (purge) gas filled in the laser de-sensitization treatment means or a pressurized fluid, for example, a pressurized air filled in the seal member 57, and further, sucking and recovering a bubble generated in the laser irradiating section 62.

Meanwhile, the laser de-sensitization treatment means 32 is provided with an inspection monitoring camera means, not shown, and a lighting means, not shown, as a maintenance target portion (weld zone) detector at the laser irradiating section 62 or in the vicinity of the laser irradiating section. The lighting means is a underwater light, for example. The inspection monitoring camera is an underwater TV camera, for example, and the underwater TV camera is provided integrally with the underwater light.

In the incore piping section maintenance system 25, it is possible to monitor a maintenance work by means of the inspection monitoring camera means from the outside of the reactor pressure vessel 1 and to perform the maintenance work in a water by remote control. Therefore, it is possible to smoothly perform a maintenance work in a state that a reactor well is filled with a water.

Moreover, in order to confirm and specify a laser execution position, the laser de-sensitization treatment means 32 is provided with an ultrasonic testing equipment (UT equipment) UT as a weld zone detector, the UT equipment being located to a portion shown in FIG. 1, for example. The UT equipment detects the laser execution position and a degree of damage in the incore piping section 26. After the executing position of the incore piping section 26 is confirmed by the UT equipment, a laser de-sensitization treatment is carried out by the laser de-sensitization treatment means 32.

Further, the laser de-sensitization treatment means 32 is provided with a ferrite indicator (FT) in place of the UT equipment or together with the UT equipment. The ferrite indicator FT distinguishes a difference in ferrite quantity between the weld zone and a base material of the incore piping section 26, and then, detects it, and thus, confirms the laser execution position, the ferrite indicator FT being located to a portion on the side or in the vicinity of the de-sensitization treatment means 32 as shown in FIG. 2, for example. After the laser execution position is confirmed, a laser beam is irradiated by the laser de-sensitization treatment means 32, and then, the incore piping section 26 is subjected to a laser de-sensitization treatment.

Furthermore, a polishing means PL is incorporated in place of the laser de-sensitization treatment means 32 or together with the laser de-sensitization treatment means 32, the polishing means PL being located to a portion shown in FIG. 1, for example. The polishing means PL is located at an angular position of a predetermined angle, for example, 180° to the laser irradiating section 62 of the laser de-sensitization treatment means 32, so as to freely reciprocate and carry out polishing with respect to a laser executed position.

The incore piping section maintenance system 25 is hung in the reactor pressure vessel 1 from a fuel exchanger (not shown) or the like by an operation of a worker, and then, is hoisted down above the downcomer portion 8 between the reactor pressure vessel 1 and the core shroud 4. In the upper portion of the downcomer portion 8, the incore piping section maintenance system 25 is placed on the shroud head bolt bracket 39 functioning as the support bracket, and then, an inner side of the maintenance system main body 30 is supported. On the other hand, an outer side thereof is pressed against the inner peripheral wall of the reactor pressure vessel by means of the fixed cylinder 40 and is frictionally supported. In this manner, the core pipe maintenance system 25 is stably fixed and supported on the incore piping section 26 which is a maintenance target portion or at the vicinity of the core pipe.

The above-mentioned maintenance target portion is a weld zone between a pipe 66 and a header 67 of the core spray pipe 27, and the weld zone is a detection target portion of the incore piping section 26.

The support means 31 of the core pipe maintenance system 25 is previously adjusted so as to be movable in an X-Y direction, so that the support means 31 faces the outside of the maintenance target portion in a state that the core pipe maintenance system 25 is fixed. Therefore, in a state that the incore piping section maintenance system 25 is fixed, when the driving motor 46 is driven, the support means 31 supported on the linear guide 45 is inserted into the pipe 66 of the core spray pipe 27 which is a maintenance target portion.

When the support means 31 is inserted by a predetermined position in the pipe 66, a pressurized fluid, for example, a compressed air is supplied into the seal member paring with the seal means 56 so as to expand the seal member 57, and thus, watertight sealing is performed. The support means 31 is inserted into the pipe 66 and is sealed by the seal means 56, and thereafter, a coolant between seal members 57 is discharged with the use of a drain pipe of the transmission tube 65. Then, a purge gas in place of the coolant is supplied from a gas supply pipe, and is filled in the seal member, and thus, an atmospheric environment is formed. The coolant between seal members 57 is discharged, and the interior of the seal member is filled with a purge gas so as to be water-tightly separated from the outside, and thereafter, a maintenance work of the laser de-sensitization treatment portions is carried out by remote control.

The laser de-sensitization treatment means 32 is rotatably supported on the fixed support means 31 via the bearing 59 and is provided with inspection monitoring camera means, an underwater light, an ultrasonic flaw detector and a ferrite indicator, which function or operate as the weld zone (maintenance target portion) detector in the laser de-sensitization treatment means 32. Thus, a position of the weld zone 27a, which is a maintenance target portion, is confirmed and detected.

Thereafter, a laser beam is irradiated to the weld zone 27a within the core spray pipe 27 which is a maintenance target portion, from the laser irradiating section 62 of the laser de-sensitization treatment means 32, and a maintenance work of the incore piping section 26 is performed.

The maintenance work by the laser de-sensitization treatment means 32 is performed by irradiating with a laser beam the weld zone 27a of the incore piping section 26 from the laser irradiating section 62. In this case, the laser irradiating section 62 is rotated along the inner periphery of the pipe 66 by a drive of the revolving motor 52, and then, a laser beam is irradiated over the entire periphery of weld zone of the incore piping section 26. The laser beam is irradiated over the entire periphery, and thereby, a surface de-sensitization of the incore piping section 26 is performed, and thus, a laser de-sensitization treatment for replacing a compressive stress of the weld zone 27a with a tensile stress is performed. By the laser de-sensitization treatment, a surface de-sensitization of the incore piping section 26 is performed, and thus, a preventive repair and preventive maintenance of the incore piping section 26 are performed. Therefore, it is possible to improve a normalization (soundness) and reliability of the incore piping section 26.

In a preferred example, the laser de-sensitization treatment will be performed by using YAG laser generator generating a continuous laser beam (continuous wave CW) of the type of Nd-YAG laser (wavelength: 1.06 $\mu$m) under an atmospheric environment.

Next, the following is a description on an incore piping section maintenance system 70 of a second embodiment of the present invention.

Figure 4:
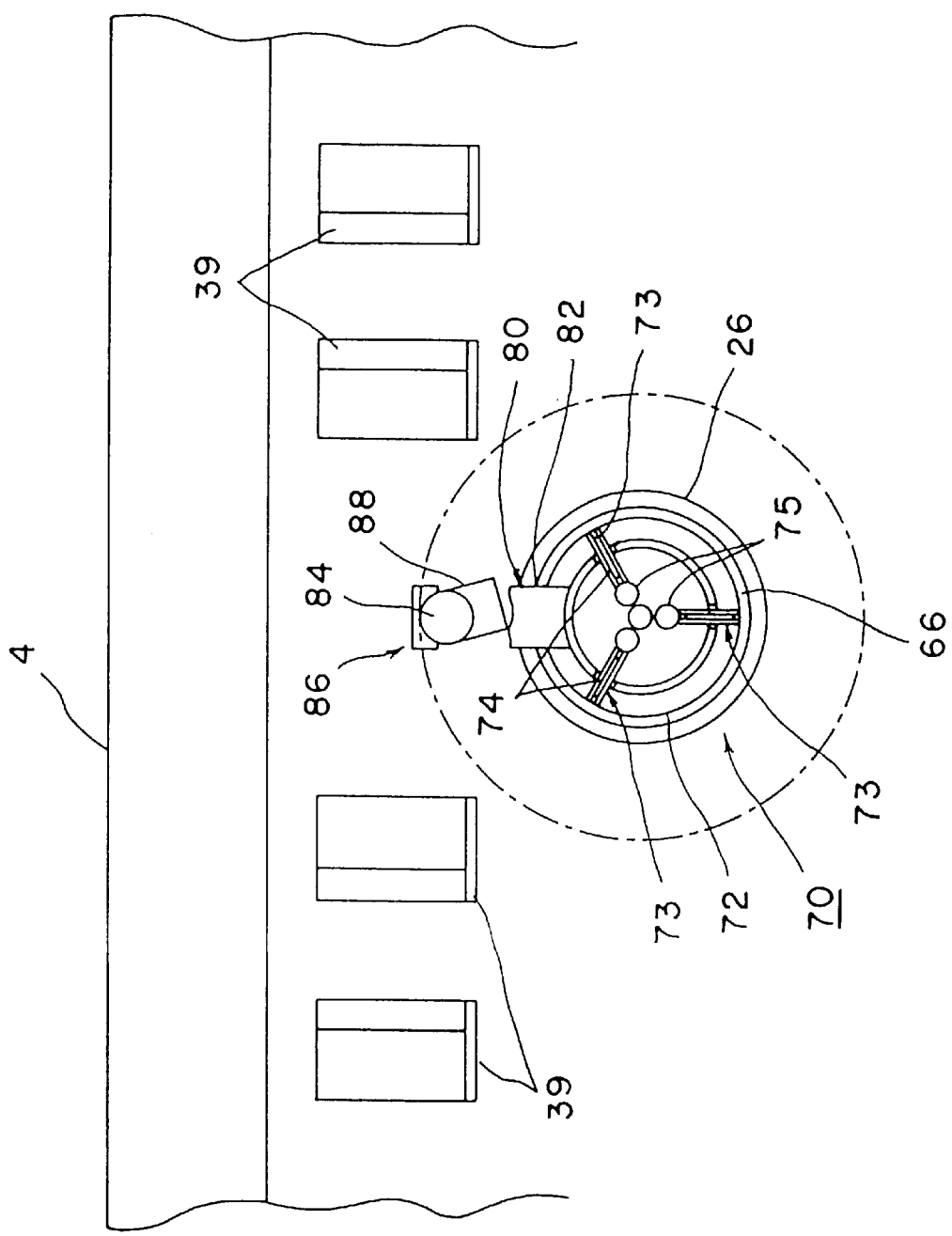
FIG. 4 is a plan view schematically showing the second embodiment of an incore piping section maintenance system of a reactor according to the present invention.

The incore piping section maintenance system 70 shown in FIG. 3 and FIG. 4 is an system for carrying out a laser de-sensitization treatment with respect to an outer peripheral surface of the incore piping section 26.

The incore piping section maintenance system 70 is removably fixed on the incore piping section 26 which is a maintenance target portion or in the vicinity of the incore piping section 26. The incore piping section maintenance system 70 of a reactor is supported above the reactor pressure vessel 1 so as to be freely moved up and down by means of hang cable (not shown) extending from a fuel exchanger or the like. Further, the incore piping section maintenance system 70 of a reactor includes a maintenance system main body 71 which is inserted and supported in the pipe 66 of the core spray pipe 27 which is the incore piping section 26.

The maintenance system main body 71 comprises a cylindrical body 72, and in the cylindrical body 72, a plurality of, for example, at least three main body supporting mechanisms 73 are radially housed therein so as to freely come in and out. The main body supporting mechanism 73 is constructed in combination with a link mechanism 74 such as a pantograph and a cylinder apparatus 75. When the cylinder apparatus 75 is activated, an inner guide 76, which is a guide member located at the distal end of the link mechanism 74, is projected outside the cylindrical body 72 so as to abut against an inner peripheral wall of the pipe 66, and thus, is fixed onto the inner peripheral wall of the pipe 66.

The maintenance system main body 71 is provided with a revolving means 80 at its cylindrical end portion. In the revolving means 80, a revolving arm 82 is rotatably supported around its boss by means of revolving motor 81. The revolving arm 82 is freely rotatable around a shaft of the maintenance system main body 71 by a drive of the revolving motor 81.

A free end portion of the revolving arm 82 is provided with a support means 84 such as a support beam which is slidable and swingable in a direction perpendicular to the arm. The support means 84 is slidably and swingably moved by means of a head driving unit 85, and thus, constitutes an axial direction moving means 86, which is axially movable with respect to the header 67.

The support means 84 is provided with a laser de-sensitization treatment means 88, which is substantially the same as the laser de-sensitization treatment means shown in FIG. 1 and FIG. 2. The laser de-sensitization treatment means 88 irradiates with a laser beam from a laser irradiating section an outer peripheral wall of the core spray pipe 27 which is an incore piping section 26 and carries out a laser de sensitization treatment with respect to the outer peripheral surface of pipe, and thus, a work for preventive maintenance and preventive repair is performed.

A laser beam oscillated from the laser generation device or equipment is guide to the laser de-sensitization treatment means 88 via a flexible optical transmission means 33. The optical transmission means 33 is formed of an optical fiber cable or the like. Further, the optical transmission means 33 is included in the transmission tube 65 together with a cable for power and control signal of drive source.

The incore piping section maintenance system 70 of a reactor is supported in its load with the use of an inner surface of the pipe 66 of the incore piping section 26 and is fixed on a maintenance target portion or in the vicinity thereof. More specifically, the maintenance system main body 71 of the incore piping section maintenance system 70 is fixed and supported on the inner peripheral surface of the pipe 66 by means of a plurality of, for example, three or more main body supporting mechanisms 73. The incore piping section maintenance system 70 is stably and securely supported in the pipe 66 by means of these three or more main body supporting mechanisms 73.

The incore piping section maintenance system 70 is fixed in the pipe 66 of the incore piping section 26 by opening and closing an inner guide 76 which functions as a guide member of the link mechanism 74. The maintenance system main body 71 is fixed on a predetermined position in the pipe 66 of the incore piping section 26, and it is therefore possible to position and set the laser de-sensitization treatment means 88 on the outer peripheral surface of the pipe 66.

After the incore piping section maintenance system 70 is fixed with the use of the pipe 66, the revolving motor 81 and the head driving unit 85 are operated. When the revolving motor 81 is driven, the laser de-sensitization treatment means 88 turns along an outer periphery of the pipe 66 so as to draw a circular orbit.

Moreover, when the head drive unit 85 is operated, the support means 84 is moved in parallel with an axial direction of the pipe 66 and makes a swing motion as occasion demands.

Thus, the laser de-sensitization treatment means 88 can effectively carry out a laser de-sensitization treatment with respect to the outer peripheral surface of the pipe 66 by a revolving (turning) motion by the revolving motor 81 and an axial movement by the head driving unit 85.

As described above, the laser de-sensitization treatment means 88 carries out a predetermined laser irradiation with respect to the pipe outer peripheral surface of the incore piping section 26 of the reactor pressure vessel 1, and thereby, a surface de-sensitization of the pipe outer surface is performed, thus, making it possible to securely perform a work for preventive repair and preventive maintenance of the pipe outer surface for a short time, whereby the core spray pipe 27 can be normally restored, and it becomes possible to improve normalization and reliability of the incore piping section 26.

It is to be noted that the present invention is not limited to the described embodiments and many other changes and modifications may be made without departing from the scopes of the appended claims.

For example, the above embodiments of the present invention have made an explanation about the incore piping section maintenance system which is suitable for preventive maintenance and preventive repair of the incore piping section of the reactor pressure vessel. The incore piping section maintenance system may be applicable not only to a boiling water reactor, but also to a pressurized water reactor. Therefore, the incore piping section maintenance system may be applicable to an incore piping section of a reactor pressure vessel of the pressurized water reactor.

It is to be noted that the present invention is not limited to the described embodiments and many other changes and modifications may be made without departing from the scopes of the appended claims.

What is claimed is:

1. An incore piping section maintenance system of a reactor, comprising:

a maintenance system main body having a portion to be inserted into a pipe of an incore piping section located in a reactor pressure vessel;

a main body supporting mechanism for detachably fixing the maintenance system main body to an inner surface of the pipe;

a turning arm mounted to another portion of the maintenance system main body and disposed outside the pipe and the maintenance system main body;

a turning mechanism for turning and driving the turning arm;

an axial moving mechanism disposed to the turning arm and slidable in a direction substantially parallel to a central axis of the pipe;

a laser generator for generating a laser beam;

a laser de-sensitization treatment mechanism supported by the axial moving mechanism and for irradiating the laser beam to an outer surface of the pipe; and an optical transmission mechanism for guiding the laser beam outputted from the laser generator to the laser de-sensitization mechanism.

2. The incore piping section maintenance system of a reactor according to claim 1, wherein the incore piping section maintenance system includes at least three main body supporting mechanisms and each of said main body supporting mechanisms is constructed in combination with a link mechanism including a guide member and a cylinder assembly for driving the guide member of the link mechanism in and out of the maintenance system main body.

* * * * *